(12) United States Patent
Kang (10) Patent No.: US 10,677,087 B2
(45) Date of Patent: Jun. 9, 2020

(54) SUPPORT STRUCTURE FOR GEARED TURBOMACHINE

(71) Applicant: General Electric Company, Schenectady, NY (US)

(72) Inventor: Weize Kang, Mason, OH (US)

(73) Assignee: General Electric Company, Schenectady, NY (US)

( * ) Notice: Subject to any disclaimer, the term of this patent is extended or adjusted under 35 U.S.C. 154(b) by 209 days.

(21) Appl. No.: 15/977,006

(22) Filed: May 11, 2018

(65) Prior Publication Data

US 2019/0345841 A1 Nov. 14, 2019

(51) Int. Cl.
*F01D 21/00* (2006.01)
*F01D 25/16* (2006.01)
*F16M 13/02* (2006.01)
*F16F 15/023* (2006.01)

(52) U.S. Cl.
CPC ........... *F01D 21/00* (2013.01); *F01D 25/164* (2013.01); *F16F 15/023* (2013.01); *F16M 13/02* (2013.01); *F05D 2220/32* (2013.01); *F05D 2260/406* (2013.01); *F05D 2260/407* (2013.01); *F05D 2260/4031* (2013.01); *F05D 2270/54* (2013.01); *F16F 2224/045* (2013.01); *F16F 2228/066* (2013.01); *F16F 2230/183* (2013.01)

(58) Field of Classification Search
CPC ...... F01D 21/00; F01D 25/164; F16F 15/023; F16F 2224/045; F16F 2228/066; F16F 2230/183; F16M 13/02; F05D 2220/32; F05D 2260/4031; F05D 2260/406; F05D 2260/407; F05D 2270/54
See application file for complete search history.

(56) References Cited

U.S. PATENT DOCUMENTS

| | | | |
|---|---|---|---|
| 3,038,765 A | 6/1962 | Tupper | |
| 5,052,828 A | 10/1991 | Ciokajlo et al. | |
| 5,110,257 A * | 5/1992 | Hibner | F01D 25/164 415/119 |
| 5,277,281 A | 1/1994 | Carlson et al. | |
| 5,658,125 A | 8/1997 | Burns et al. | |
| 5,915,513 A | 6/1999 | Isley, Jr. et al. | |
| 5,931,052 A | 8/1999 | Zhao et al. | |
| 5,984,056 A | 11/1999 | Agnihotri et al. | |
| 6,116,784 A | 9/2000 | Brotz | |
| 6,183,386 B1 | 2/2001 | Duggan | |
| 6,260,351 B1 | 7/2001 | Delano et al. | |
| 7,018,102 B1 | 3/2006 | Brotz | |
| 7,115,336 B2 | 10/2006 | Revol | |
| 7,138,093 B2 | 11/2006 | McKay et al. | |
| 7,431,504 B1 | 10/2008 | Pelfrey | |

(Continued)

OTHER PUBLICATIONS

U.S. Appl. No. 15/346,202, filed Nov. 8, 2016.
(Continued)

*Primary Examiner* — Igor Kershteyn
*Assistant Examiner* — Brian O Peters
(74) *Attorney, Agent, or Firm* — Dority & Manning, P.A.

(57) ABSTRACT

A gas turbine engine including a support structure including a conduit coupled to a static support. The conduit defines an end wall between which a fluid is contained within a volume defined by the conduit. An effort variable provided to the support structure modulates a stiffness of the support structure.

18 Claims, 6 Drawing Sheets

(56) References Cited

U.S. PATENT DOCUMENTS

| | | | |
|---|---|---|---|
| 8,205,445 B2 | 6/2012 | Browne et al. | |
| 8,359,744 B2 | 1/2013 | Hislop et al. | |
| 8,413,773 B2 | 4/2013 | Anderfaas et al. | |
| 8,527,247 B1 | 9/2013 | Wilson et al. | |
| 8,662,756 B2 | 3/2014 | Care et al. | |
| 8,702,377 B2 | 4/2014 | Crottrell et al. | |
| 8,727,632 B2 | 5/2014 | Do et al. | |
| 8,814,503 B2 | 8/2014 | McCune et al. | |
| 8,936,660 B2 | 1/2015 | Cruz Aguado | |
| 8,974,344 B2 | 3/2015 | McCune et al. | |
| 9,091,309 B2 | 7/2015 | Battlogg | |
| 9,103,321 B1 | 8/2015 | Bardia | |
| 9,121,305 B2 | 9/2015 | Nicholson | |
| 9,121,448 B2 | 9/2015 | Delgado Marquez et al. | |
| 9,134,072 B2 | 9/2015 | Roisin et al. | |
| 9,239,012 B2 | 1/2016 | McCune et al. | |
| 9,297,310 B2 | 3/2016 | Giri et al. | |
| 9,447,817 B2 | 9/2016 | Gallimore et al. | |
| 9,476,320 B2 | 10/2016 | Savela | |
| 9,500,230 B2 | 11/2016 | Hiller et al. | |
| 9,512,874 B2 | 12/2016 | Hennig | |
| 9,523,422 B2 | 12/2016 | McCune et al. | |
| 9,528,776 B1 | 12/2016 | Roper et al. | |
| 9,546,570 B2 | 1/2017 | Fletcher et al. | |
| 9,562,616 B2 | 2/2017 | Strom et al. | |
| 9,638,062 B2 | 5/2017 | Davis | |
| 9,644,541 B2 | 5/2017 | Morreale et al. | |
| 9,714,584 B2 | 7/2017 | Morris | |
| 2010/0129223 A1* | 5/2010 | Benito Santiago | F16C 33/10 416/174 |
| 2012/0076652 A1* | 3/2012 | Ventzke | F16F 9/53 416/1 |
| 2012/0292143 A1 | 11/2012 | Anderfaas et al. | |
| 2013/0195654 A1* | 8/2013 | Berger | F03D 7/02 416/1 |
| 2014/0186200 A1* | 7/2014 | Petersen | F01D 7/00 417/393 |
| 2015/0217866 A1 | 8/2015 | Spina et al. | |
| 2016/0003085 A1* | 1/2016 | Roberge | F01D 11/20 415/1 |
| 2016/0138421 A1 | 5/2016 | Duong et al. | |
| 2016/0215760 A1 | 7/2016 | Powell | |
| 2016/0312645 A1 | 10/2016 | Ribarov et al. | |
| 2016/0341070 A1 | 11/2016 | Garcia et al. | |
| 2016/0376984 A1 | 12/2016 | Sheridan | |
| 2017/0009655 A1 | 1/2017 | Savela | |
| 2017/0030223 A1 | 2/2017 | Parry et al. | |
| 2017/0051629 A1 | 2/2017 | Sutherland | |
| 2017/0058697 A1 | 3/2017 | Copeland et al. | |
| 2017/0089353 A1 | 3/2017 | Zhang et al. | |
| 2017/0145855 A1 | 5/2017 | Ganiger et al. | |
| 2017/0175523 A1 | 6/2017 | McCune et al. | |
| 2017/0175581 A1 | 6/2017 | McCune et al. | |
| 2017/0175582 A1 | 6/2017 | McCune et al. | |
| 2017/0234158 A1 | 8/2017 | Savela | |
| 2017/0248191 A1 | 8/2017 | Husband et al. | |
| 2017/0260875 A1 | 9/2017 | McCune et al. | |
| 2019/0345841 A1* | 11/2019 | Kang | F16F 15/023 |

OTHER PUBLICATIONS

Carmignani et al., Design of a novel magneto-rheological squeeze-film damper, Smart Materials and Structures, vol. 15, Institute of Physics Publishing, 2006, pp. 164-170 http://resource.isvr.soton.ac.uk.staff.pubs/PubPDFs/Pub8088.pdf.

Zhu et al, A Magneto-rheological Fluid Squeeze Film Damper for Rotor Vibration Control, pp. 516-522.

Kumar et al., Development of Smart Squeeze Film Dampers for Small Rotors, Procedia Engineering, 144, 2016, pp. 790-800.

Xu, et al., Squeeze flow behaviors of magnetorheological plastomers under constant volume, The Society of Rheology, Inc., 2014, pp. 659-679.

* cited by examiner

SUPPORT STRUCTURE FOR GEARED TURBOMACHINE

FIELD

The present subject matter relates generally to support structures for turbine engine power or reduction gear assemblies.

BACKGROUND

Turbine engines including gear assemblies to provide a speed or direction change at a fan assembly generally require a narrow range of stiffness for a supporting structure. Sufficiently soft or low stiffness supporting structures are generally necessary to mitigate load transfer from the fan assembly to the gear assembly. However, insufficiently stiff supporting structures enable undesired vibratory modes at the gear assembly. Additionally, the supporting structure may generally provide dampening or vibratory isolation between the gear assembly and the surrounding engine. However, such desired vibratory isolation varies based on the frequency of vibration, such as due to engine operating condition.

As such, there is a need for a support structure that provides a desired magnitude of stiffness across various engine conditions.

BRIEF DESCRIPTION

Aspects and advantages of the invention will be set forth in part in the following description, or may be obvious from the description, or may be learned through practice of the invention.

The present disclosure is directed to a gas turbine engine including a support structure including a conduit coupled to a static support. The conduit defines an end wall between which a fluid is contained within a volume defined by the conduit. An effort variable provided to the support structure modulates a stiffness of the support structure.

In various embodiments, the engine further includes a gear assembly including a first gear, a second gear, and a torque transfer component. The static support of the support structure is coupled to the torque transfer component. In one embodiment, the static support defines a ring gear or a carrier element of the gear assembly.

In various embodiments, the engine further includes an effort supply system providing the effort variable to the support structure. The effort variable defines a pressure of fluid or an electrical current. In one embodiment, the effort variable defines a pressure of pneumatic fluid from a compressor section of the engine. In another embodiment, the effort supply system defines an electric machine in which the effort variable defines an electric current.

In one embodiment, the fluid within the conduit defines a hydraulic fluid, a pneumatic fluid, a lubricant, or a magneto-rheological fluid.

In another embodiment, the end wall defines a bladder, a diaphragm, or a piston cylinder.

In yet another embodiment, the static support is coupled to a rotor assembly.

In various embodiments, the engine further includes a sensor configured to acquire or calculate a signal defining an operational parameter of the engine, and one or more controllers including one or more processors and one or more memory devices. The one or more memory devices store instructions that when executed by the one or more processors cause the one or more processors to perform operations. The operations include acquiring, via the sensor, a signal defining an operational parameter of the engine; sending, via the sensor, the operational parameter to the controller; and sending, via the controller, a control signal to modulate the effort variable to alter the stiffness of the support structure.

In one embodiment, the operations further include determining, via the controller, a difference between an actual measurement of the operational parameter versus a desired parameter value.

In various embodiments, the operations further include sending, via the controller, a commanded magnitude of the effort variable to an effort supply system. In one embodiment, the commanded magnitude of the effort variable is a desired magnitude of pressure at the fluid within the conduit. In another embodiment, the commanded magnitude of the effort variable is a desired magnitude of magnetic flux at the fluid within the conduit. In still another embodiment, the commanded magnitude of the effort variable is based at least in part on a vibration measurement at the static support, the gear assembly, or both, a rotational speed at the rotor assembly, a pressure, flow, or current at the fluid, the effort variable, or both, or a displacement at the end wall of the conduit, or combinations thereof.

In various embodiments, the operations further include altering the stiffness of the support structure via modulating the end wall of the support structure. In one embodiment, modulating the end wall includes altering the volume of the conduit of the support structure. In another embodiment, modulating the end wall includes altering a magnetic flux at the fluid within the conduit. In one embodiment, altering the magnetic flux includes altering the effort variable defining an electrical current.

In one embodiment, the effort variable defines a pressure of hydraulic fluid, pneumatic fluid, lubricant, liquid or gaseous fuel, or combinations thereof.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of a turbine engine including embodiments of a variable stiffness support structure are generally provided. Embodiments of the support structure generally shown and described herein provide passive or active variability of stiffness at one or more of a power or reduction gear assembly, an accessory gear assembly, a bearing assembly, or other static structure generally based on one or more engine conditions or changes in engine condition. The embodiments of the engine and support structure shown and described herein enables variation of stiffnesses such as to provide a desired magnitude of stiffness such as to mitigate load transfer to the static structure, to mitigate undesired vibratory modes at the static support structure and/or gear assembly, accessory gear assembly, or bearing assembly to which the static support structure is attached, and/or to isolate or dampen undesired vibrations based on changes in engine condition.

Figure 1:
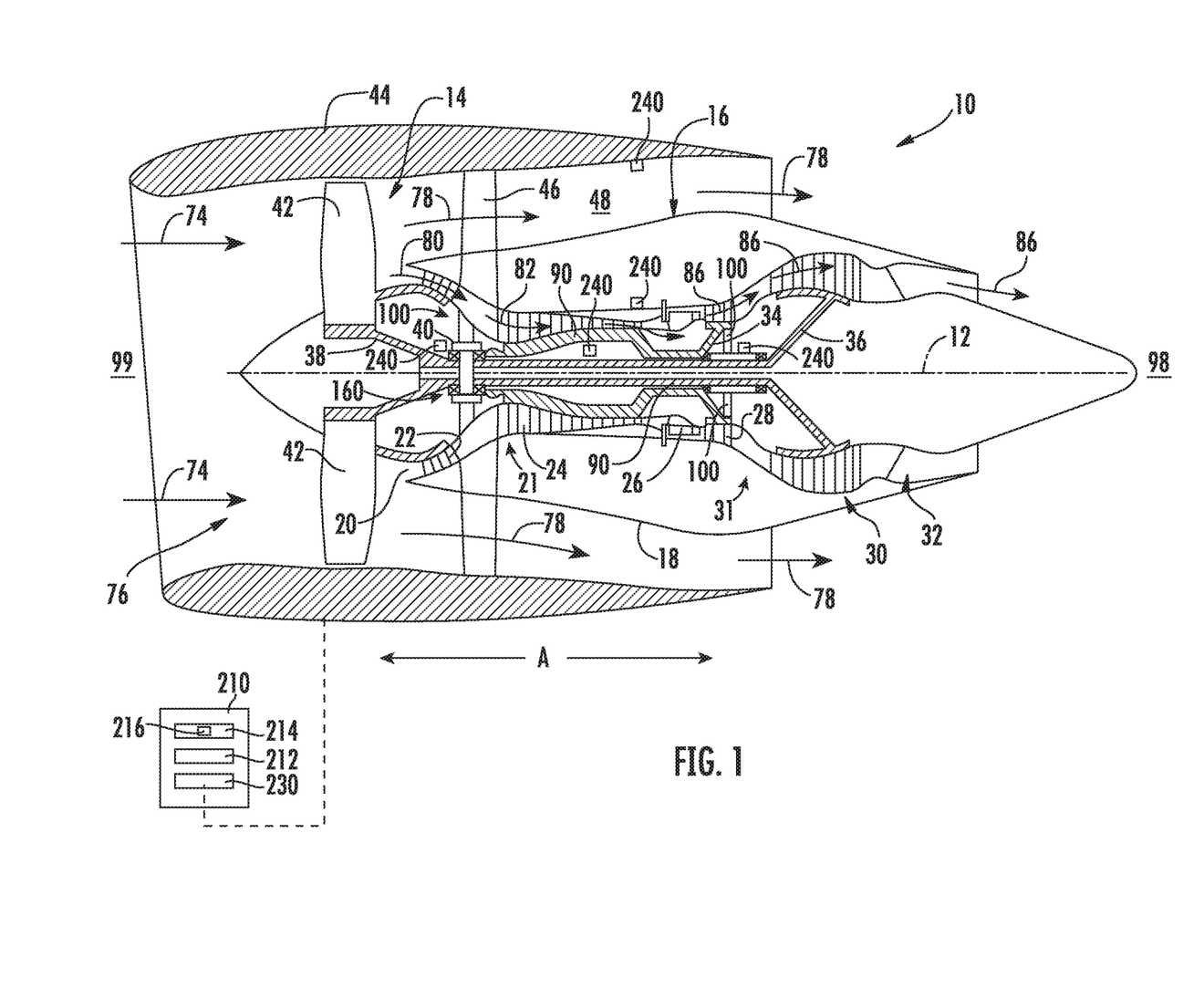
FIG. 1 is an exemplary embodiment of a turbine engine including a variable stiffness support structure according to an aspect of the present disclosure.

Referring now to the drawings, FIG. 1 is a schematic partially cross-sectioned side view of an exemplary gas turbine engine 10 herein referred to as "engine 10" as may incorporate various embodiments of the present invention. Although generally depicted herein as a turbofan configuration, the engine 10 shown and described herein may further define a turboprop or turboshaft configuration. As shown in FIG. 1, the engine 10 has a longitudinal or axial centerline axis 12 that extends there through for reference purposes. In general, the engine 10 may include a fan assembly 14 and a core engine 16 disposed downstream of the fan assembly 14.

The core engine 16 may generally include a substantially tubular outer casing 18 that defines an annular inlet 20. The outer casing 18 encases or at least partially forms, in serial flow relationship, a compressor section 21 having a booster or low pressure (LP) compressor 22, a high pressure (HP) compressor 24, or one or more intermediate pressure (IP) compressors (not shown) disposed aerodynamically between the LP compressor 22 and the HP compressor 24; a combustion section 26; a turbine section 31 including a high pressure (HP) turbine 28, a low pressure (LP) turbine 30, and/or one or more intermediate pressure (IP) turbines (not shown) disposed aerodynamically between the HP turbine 28 and the LP turbine 30; and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. In other embodiments, an IP rotor shaft drivingly connects the IP turbine to the IP compressor (not shown). The LP rotor shaft 36 may also, or alternatively, be connected to a fan shaft 38 of the fan assembly 14. In particular embodiments, such as shown in FIG. 1, the LP shaft 36 may be connected to the fan shaft 38 via a power or reduction gear assembly 40 such as in an indirect-drive or geared-drive configuration.

Combinations of the compressors 22, 24, the turbines 28, 30, and the shafts 34, 36, 38 each define a rotor assembly 90 of the engine 10. For example, in various embodiments, the LP turbine 30, the LP shaft 34, the fan assembly 14 and/or the LP compressor 22 together define the rotor assembly 90 as a low pressure (LP) rotor assembly. The rotor assembly 90 may further include the fan rotor 38 coupled to the fan assembly 14 and the LP shaft 34 via the gear assembly 40. As another example, the HP turbine 28, the HP shaft 36, and the HP compressor 24 may together define the rotor assembly 90 as a high pressure (HP) rotor assembly. It should further be appreciated that the rotor assembly 90 may be defined via a combination of an IP compressor, an IP turbine, and an IP shaft disposed aerodynamically between the LP rotor assembly and the HP rotor assembly.

Figure 2A:
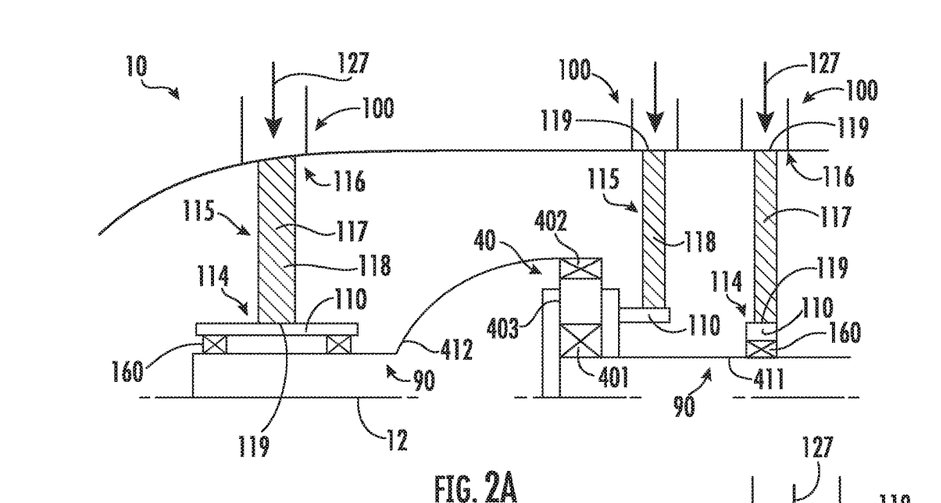
FIGS. 2A-2C are schematic views of a portion of an embodiment of an engine including a variable stiffness support structure according to aspects of the present disclosure.
Figure 2B:
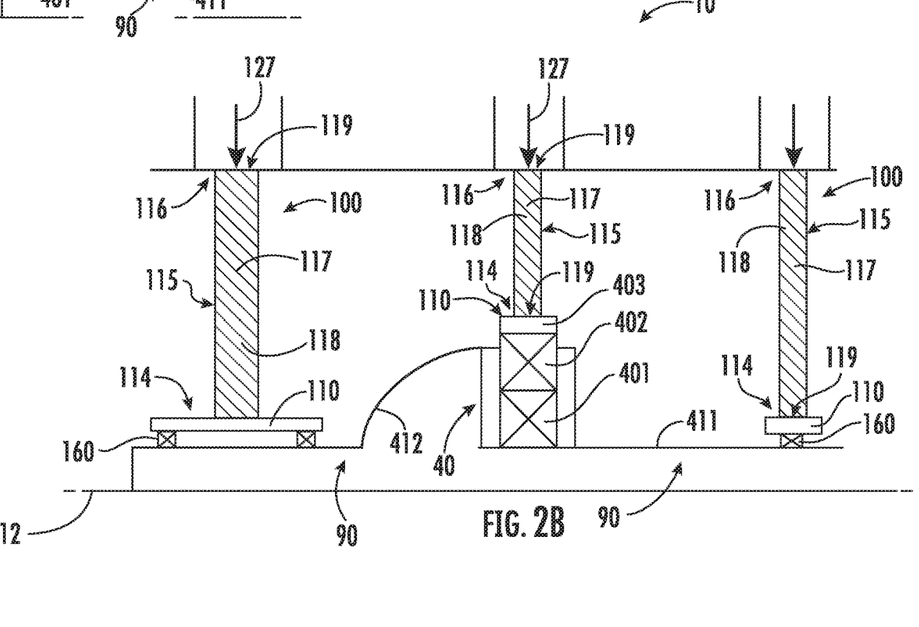
Figure 2C:
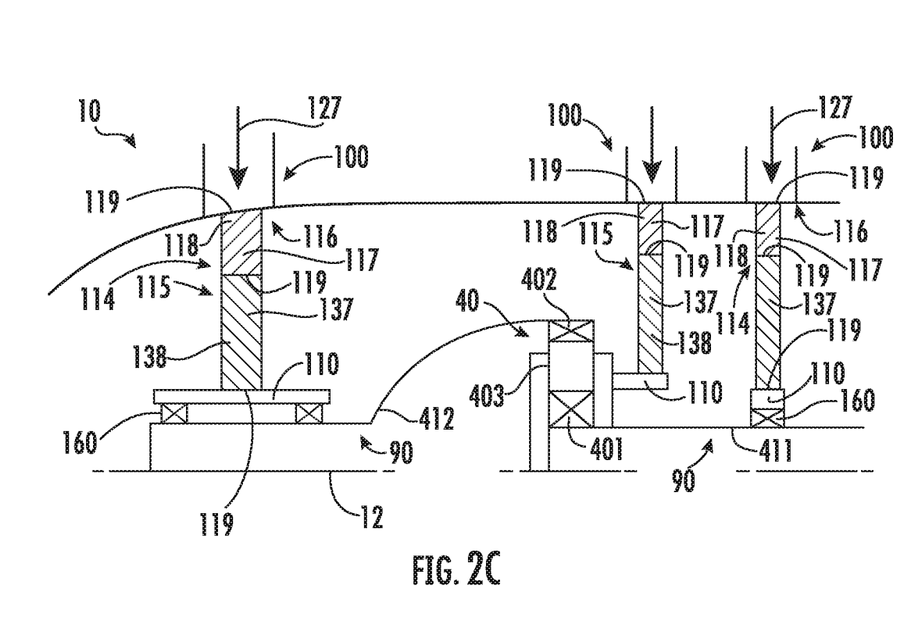

In still various embodiments, the rotor assembly 90 further includes a bearing assembly 160 enabling rotation of the shaft (e.g., shaft 34, 36, 38) relative to a surrounding grounding or static structure (e.g., outer casing 18), such as further shown and described in regard to FIG. 2.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Referring now to FIGS. 2A-2C, a partial schematic cross sectional view of the engine 10 is generally provided in further detail. In one embodiment, the rotor assembly 90 includes one or more bearings 160 coupled to the shaft 34, 36, 38. The bearings 160 may include, but are not limited to, rolling element bearings (e.g., straight or tapered roller bearings, ball or thrust bearings, etc.), fluid film bearings, etc. In another embodiment, the rotor assembly 90 may further include a rotary element of the power or reduction gear assembly 40. For example, the power or reduction gear assembly 40 may define an epicyclical gear assembly. The gear assembly 40 may include a first gear 401 rotatable relative to the axial centerline 12 of the engine. The first gear 401 is coupled to a first rotor 411. In various embodiments, the first rotor 411 may define the LP shaft 34, the HP shaft 36, the fan shaft 38 (FIG. 1), or an IP shaft. The gear assembly 40 may further include a second gear 402 rotatable relative to the axial centerline 12 of the engine 10. The second gear 402 is coupled to a second rotor 412. In various embodiments, the second rotor 412 may define a shaft (e.g., shafts 34, 36, 38 shown in FIG. 1, or an intermediate shaft) different from the first rotor 411.

The gear assembly 40 may further include a torque transfer component 403 coupled to one or more of the first gear 401, the second gear 402, or both. The torque transfer component 403 may generally define a static structure providing transfer of power or torque to or from the first rotor 411 and the second rotor 412. For example, such as generally provided in regard to FIG. 2A, the torque transfer component 403 may generally define one or more a planet gears disposed between the first gear 401 (e.g., defining a sun gear) and the second gear 402 (e.g., defining a ring gear). As another example, such as generally provided in regard to FIG. 2B, the torque transfer component 403 may generally define a ring gear. Regarding FIGS. 2A-2C, in various embodiments, the torque transfer component 403 is generally stationary relative to the axial centerline 12, such as to enable power or torque between the first rotor 411 and the second rotor 412.

Referring still to FIGS. 2A-2C, in still various embodiments, the torque transfer component 403 is coupled to a static support 110. The static support 110 may generally define a grounding structure, such as, but not limited to, a frame, casing, housing, etc. In one embodiment, the static support 110 may define a carrier element of the gear assembly 40. The static support 110 may generally be coupled to the torque transfer component 403 of the gear assembly 40.

In other embodiments, the static support 110 may generally define a grounding structure (e.g., frame, casing, housing, etc.) coupled to the bearing 160. For example, the static support 110 may define a static bearing housing between which the bearing element 160 is coupled to the shaft (e.g., shaft 34, 36, 38) of the rotor assembly 90. As another example, the support structure 100 is coupled to the static support 110 and to the surrounding engine 10 (e.g., the outer casing 18, the nacelle 44, or one or more frames, casings, housings, etc. generally supporting the rotor assembly 90).

Referring still to FIGS. 2A-2C, in various embodiments, the support structure 100 provides dynamic or variable stiffness to the grounding element or static support 110 coupled to the rotor assembly 90 of the engine 10. The variable stiffness of the support structure 100 is adjustable based at least in part on variable or changing loads from the engine 10 (e.g., due to changes in engine operating condition) to the support structure 100.

The support structure 100 includes an at least partially hollow walled conduit 115 coupled to the static support 110. The conduit 115 contains a fluid 117 within a volume 118 defined by the conduit 115. In various embodiments, the fluid 117 defines a variable shock absorbing fluid. For example, such as generally provided in regard to FIGS. 2A-2C, the fluid 117 may generally define an energy variable, such as, but not limited to, a volume of a pneumatic fluid (e.g., air or gas) or another compressible fluid, or a charge at a magneto-rheological fluid, or another fluid appropriate for adjusting a stiffness of the support structure 100 based on engine condition.

The fluid 117 is contained within the conduit 115 via one or more end walls 119. In various embodiments, end walls 119 contain within the conduit 115 a volume of the fluid 117 such as to define a variable stiffness element of the support structure 100. For example, in one embodiment, the end wall 119 is defined at a first end 114. In various embodiments, such as shown in regard to FIGS. 2A-2B, the end wall 119 at the first end 114 is defined at the static support 110.

As another example, the end wall 119 is defined at a second end 116, in which the first end 114 and the second end 116 are separated by the fluid 117 contained within the conduit 115. In still various embodiments, the end wall 119 may define displacement change structure, such as, but not limited to, a bladder, a diaphragm, or a piston cylinder. The end wall 119 may thereby alter the volume 118 at the conduit 115 such as to alter a pressure of the fluid 117. As such, altering the pressure of the fluid 117 alters or varies the stiffness of the support structure 100.

In another embodiment, such as shown in regard to FIG. 2C, the end wall 119 at the first end 114 is defined within the conduit 115, such as to separate the fluid 117 from an incompressible fluid 137. In various embodiments, the incompressible fluid 137 may define a hydraulic fluid. The incompressible fluid 137 may generally be defined within a second volume 138 within the conduit 115. For example, such as generally provided in regard to FIG. 2C, the second volume 138 may contain the incompressible fluid 137 between the end wall 119 at the static support 110 and the end wall 119 at the first end 114. The fluid 117, such as defining a compressible fluid, may generally be defined within the volume 118 within the conduit 115 between the end wall 119 at the first end 114 and the end wall 119 at the second end 116.

In still various embodiments, such as generally provided in regard to FIGS. 2A-2C, the end wall 119 may define a node at which a current is provided from the effort variable 127 to the fluid 117 within the conduit 115. As such, altering the effort variable 127 defining a current alters a magnetic flux at the fluid 117 defining a magneto-rheological fluid such as to alter or vary the stiffness of the support structure 100.

Referring back to FIG. 1, the engine 10 may further include a controller 210. In general, the controller 210 can correspond to any suitable processor-based device, including one or more computing devices. For instance, FIG. 1 illustrates one embodiment of suitable components that can be included within the controller 210. As shown in FIG. 1, the controller 210 can include a processor 212 and associated memory 214 configured to perform a variety of computer-implemented functions. In various embodiments, the controller 210 may be configured to actively adjust or modulate a stiffness of the support structure 100 via changes in pressure or magnetic flux at the fluid 117 within the conduit 115.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC).

As shown, the controller 210 may include control logic 216 stored in memory 214. The control logic 216 may include instructions that when executed by the one or more processors 212 cause the one or more processors 212 to perform operations such as to adjust or vary the stiffness of the support structure 100 such as shown and described herein.

Additionally, as shown in FIG. 1, the controller 210 may also include a communications interface module 230. In various embodiments, the communications interface module 230 can include associated electronic circuitry that is used to send and receive data. As such, the communications interface module 230 of the controller 210 can be used to receive data from the rotor assembly 90, the gear assembly 40, the static support 110, the bearing 160, or a sensor 240 proximate or attached thereto providing an operational parameter, such as a vibrations measurement (e.g., an accelerometer, a proximity probe, a displacement probe, etc.), stress or strain (e.g., a strain gage), thrust output (e.g., calculated via engine pressure ratio), or applied load (e.g., a load cell), pressure (e.g., a pressure transducer), or rotational speed (e.g., a 1/rev signal, a tachometer, or other speed detection device proximate to the rotor assembly 90). In addition, the communications interface module 230 can also be used to communicate with any other suitable components of the engine 10, including any number of sensors 240 configured to monitor one or more operating parameters of the engine 10.

It should be appreciated that the communications interface module 230 can be any combination of suitable wired and/or wireless communications interfaces and, thus, can be communicatively coupled to one or more components of the engine 10 (e.g., the static support 110, the gear assembly 40, the bearing 160, the rotor assembly 90, the outer casing 18, the nacelle 44, etc.) via a wired and/or wireless connection. As such, the controller 210 may modulate the effort variable 127 such as to adjust, modulate, or otherwise control the pressure or current provided to the fluid 117, thereby adjusting or modulating the stiffness of the support structure 100 via changes in volume 118 (i.e., via displacement of the end wall 119) of the conduit 115 containing the fluid 117, or changes in magnetic flux at the fluid 117 defining a magnetorheological fluid. Additionally, or alternatively, the controller 210 may modulate the stiffness of the support structure 100 based at least on an engine condition. For example, the controller 210 may modulate the stiffness of the support structure 100 in direct relationship to the engine condition.

During operation of the engine 10, as shown in FIGS. 1-2 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26.

Referring still to FIGS. 1-2 collectively, the combustion gases 86 generated in the combustion section 26 flows to the HP turbine 28 of the turbine section 31, thus causing the HP shaft 34 to rotate, thereby supporting operation of the HP compressor 24. As shown in FIG. 1, the combustion gases 86 are then routed to the LP turbine 30, thus causing the LP shaft 36 to rotate, thereby supporting operation of the LP compressor 22 and rotation of the fan shaft 38. The combustion gases 86 are then exhausted through the jet exhaust nozzle section 32 of the gas turbine engine 16 to provide propulsive thrust.

During operation of the engine 10, the variable stiffness support structure 100 enables a relatively soft or low stiffness support such as to mitigate transfer of loads from the second rotor 412 (e.g., from the fan assembly 14 via the second rotor 412 defining the fan rotor 38) to the gear assembly 40 and/or the first rotor 411. Such loads may include those generated via normal operation of the fan assembly 14. For example, normal operation may generally include startup, ignition, low power or part-load operating condition, up to and including high power or full-load operating condition. As another example, normal operation may generally include ignition, ground idle condition, take-off condition, and one or more intermediate or mid-power conditions therebetween. Additionally, or alternatively, loads generated may include those via abnormal operation of the engine 10. For example, abnormal operation may include component or detachment (e.g., fan blade 42 failure, or another blade of the rotor assembly 90, etc.) static structure detachment generating increased loads, or domestic or foreign object debris (e.g., debris or bird ingestion, water or hail ingestion, etc.), or other conditions that may induce increased vibrations or loads at the rotor assembly 90 or support structure 100.

Still further, during operation of the engine 10, the variable stiffness support structure 100 enables a sufficiently high stiffness support such as to prevent undesired vibration modes from propagating at the gear assembly 40. Additionally, or alternatively, the variable stiffness support structure 100 defines a stiffness sufficient to mitigate loads from propagating from the rotor assembly 90 (e.g., from the fan assembly 14, the LP rotor, the HP rotor, etc.) to the gear assembly 40.

Figure 3:
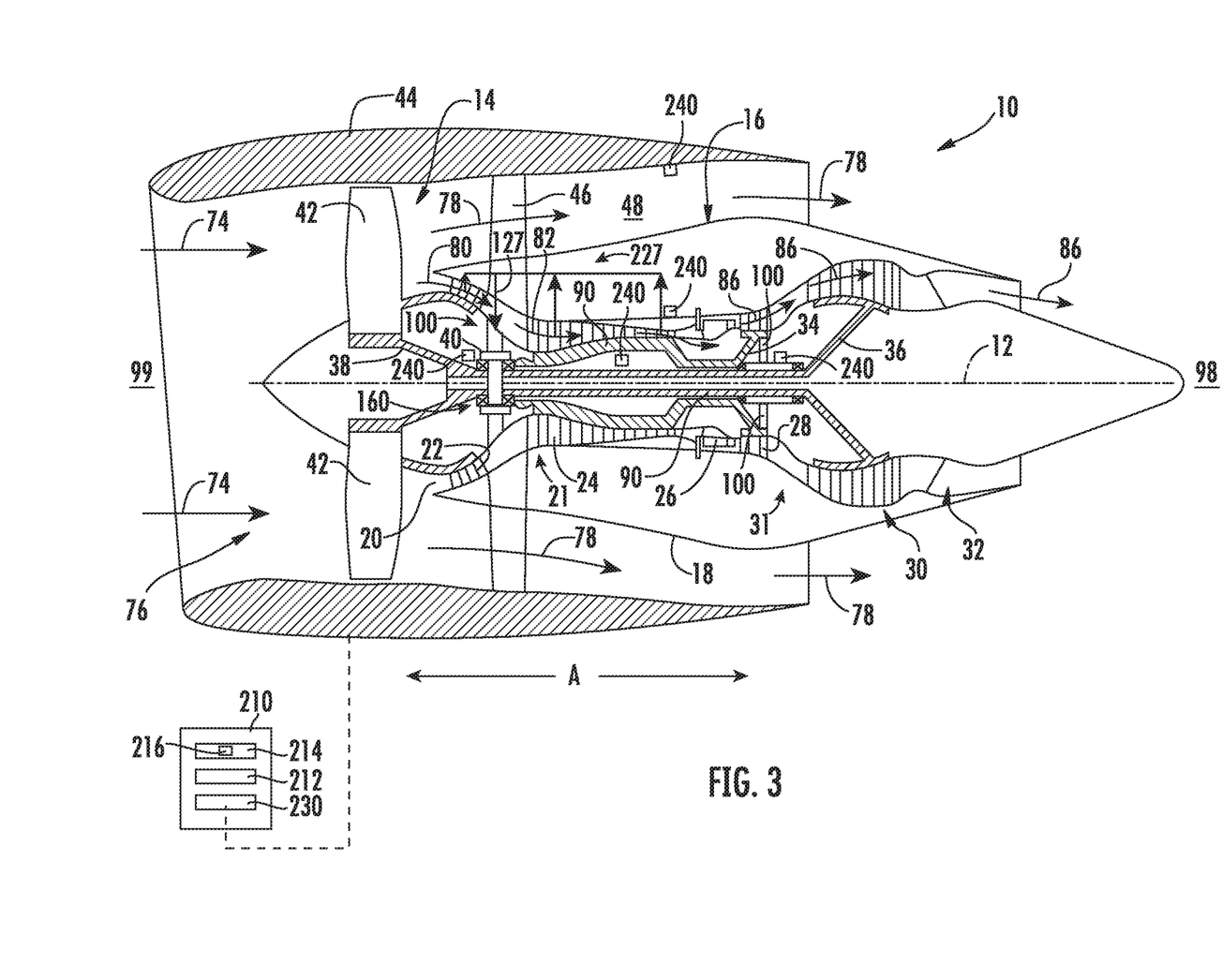
FIGS. 3-4 are exemplary embodiments of turbine engines including embodiments of a variable stiffness support structure according to aspects of the present disclosure.
Figure 4:
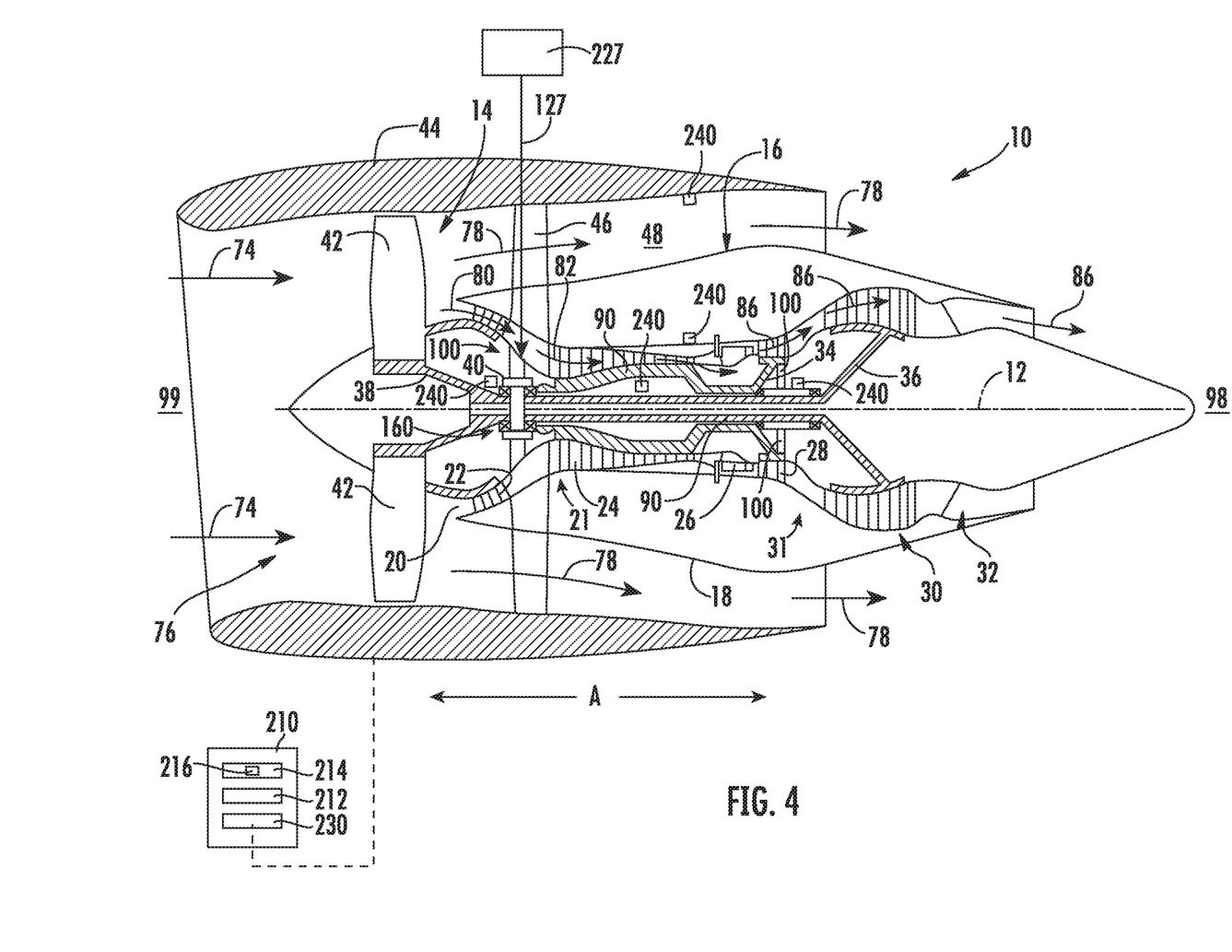

Referring now to FIGS. 2-4, the engine 10 provides an effort variable 127 to the fluid 117 within the conduit 115 of the support structure 100. In various embodiments, the effort variable 127 includes pneumatic, hydraulic, or lubricant pressure or an electrical current. In one embodiment, the effort variable 127 defines pneumatic, hydraulic, or lubricant fluid adjusting the volume 118 of the conduit 115 in which the fluid 117 is contained via displacement of the end wall 119 based on an engine condition, or changes in engine condition. The volume 118 of the conduit 115 may be adjusted via actuation or displacement of one or more of the end walls 119 such as to decrease or increase the volume 118 of the conduit 115 in which the fluid 117 is contained.

Referring to FIG. 3, in one embodiment, the effort variable 127 may be defined by a portion of the flow of air 80, 82 directed from an effort supply system 227. In one embodiment, the effort supply system 227 is defined, at least in part, by the compressor section 21 providing a portion of the flow of air 80, 82 to the support structure 100. In other embodiments, the effort variable 127 may be defined by a portion of lubricant, hydraulic fluid, or liquid or gaseous fuel directed to the support structure 100. In various embodiments, the variable stiffness support structure 100 may define a passive variable stiffness support structure. For example, the passive variable stiffness support structure may adjust or modulate stiffness of the support structure 100 based at least on changes in engine condition. In various embodiments, changes in engine condition include changes in flow, pressure, or temperature of air 80, 82 or combustion gases 86 through the engine 10. As such, the effort variable 127 defining a portion of air 80, 82 adjusts or modulates the volume 118 of the fluid 117 within the conduit 115 via displacement of the end wall 119 (e.g., the end wall 119 disposed at the second end 116) corresponding to changes in engine condition (e.g., startup, ignition, low-power, mid-power, or high-power operation, normal engine operation, abnormal engine operation, etc.).

Referring to FIG. 4, in another embodiment, the effort variable 127 may be defined by a flow or current from an effort supply system 227. For example, in one embodiment, the effort supply system 227 may selectively provide the effort variable 127 to the support structure 100. In one embodiment, the effort supply system 227 is defined, at least in part, by the compressor section 21. In various embodiments, the effort supply system 227 defines a fluid supply system providing the effort variable 127 defining a pressurized flow of pneumatic fluid (e.g., air 80, 82, air from an air cycle machine, etc.), hydraulic fluid, or lubricant to the support structure 100. In one embodiment, the effort supply system 227 defines, at least in part, a lubricant supply system further providing and/or scavenging a flow of lubricant to or from the bearings 160. In another embodiment, the effort supply system 227 defines, at least in part, a fuel supply system further providing and/or scavenging the effort variable 127 defining a flow of liquid or gaseous fuel to or from the support structure 100, the combustion section 26, or one or more heat exchangers (not shown) of the engine 10.

Referring to FIGS. 2A-2C and FIG. 4, in still another embodiment, the effort supply system 227 defines, at least in part, a piezoelectric device or electric machine (e.g., motor, generator, energy storage device, battery, capacitor, etc.) providing the effort variable 127 defining an electrical current to the support structure 100 defining the fluid 117 (FIGS. 2A-2B) as a magneto-rheological fluid. In various embodiments, the fluid 117 defining a magneto-rheological fluid may include a lubricant (e.g. oil) carrying magnetic particles distributed within the lubricant. The magnetic particles within the fluid 117 defining a magneto-rheological fluid align along the lines of magnetic flux when the effort variable 127 defining an electrical current is supplied to the fluid 117. Adjusting or modulating the effort variable 127 defining an electrical current alters the stiffness of the support structure 100 via changes in the alignment along the lines of magnetic flux of particles within the fluid 117.

In various embodiments, the effort supply system 227 defining a piezoelectric device may passively provide the effort variable 127 defining an electric current based on the engine condition. For example, the effort supply system 227 defining a piezoelectric device may generate the effort variable 127 as an electric current based on changes in pressure at the engine 10, such as, but not limited to, changes in pressure at the compressor section 21, the combustion section 26, the turbine section 31, the exhaust section 32, and/or the fan assembly 14. Additionally, or alternatively, changes in pressure at the engine 10 may include changes in pressure of a fluid within the engine 10, such as, but not limited to, the air 78, 80, 82, combustion gases 86, and/or hydraulic fluid, fuel, or lubricant flowing within the engine 10.

Figure 5:
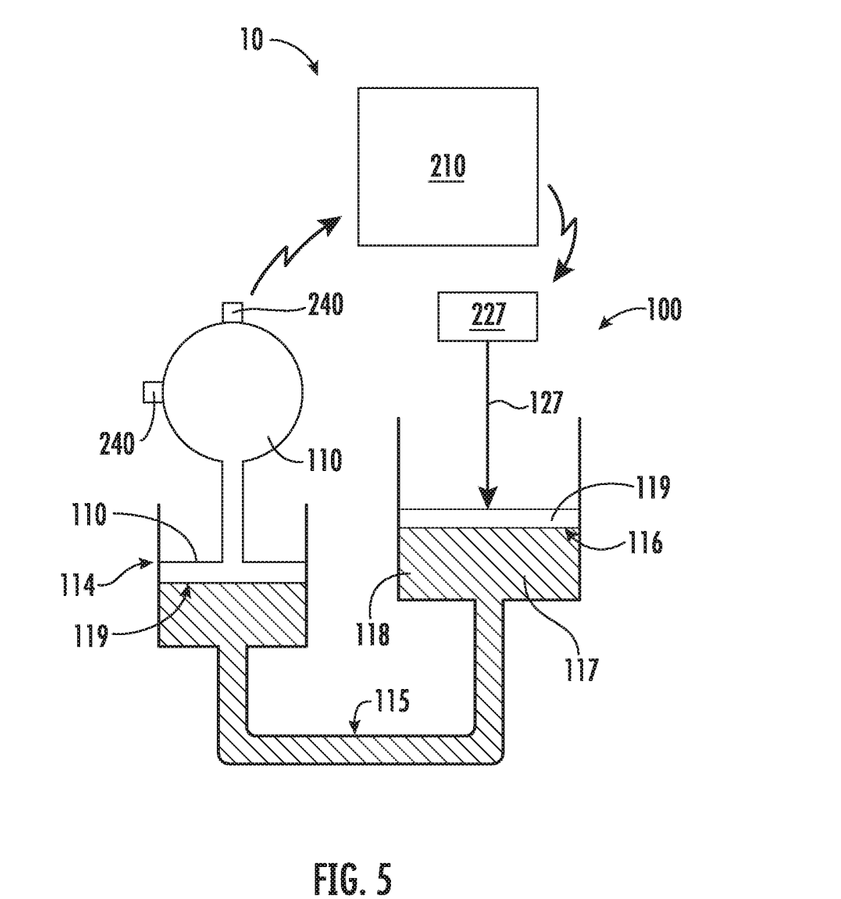
FIG. 5 is a schematic of an embodiment of a portion of an engine including a variable stiffness support structure according to an aspect of the present disclosure.

Referring now to FIG. 5, an exemplary schematic embodiment of the engine 10 including the support structure 100 configured to actively variably control the stiffness is generally provided. The exemplary embodiment generally shown and described in regard to FIG. 5 is configured substantially similarly as shown and described in regard to FIGS. 1-4. In regard to FIG. 5, during operation of the engine 10, the sensor 240 acquires or otherwise receives or calculates a signal defining an operational parameter of the engine 10. For example, the sensor 240 may receive or otherwise acquire a vibration measurement at the static support 110 and/or gear assembly 40, a rotational speed at the rotor assembly 90, a pressure or current at the fluid 117 and/or effort variable 127, or a displacement at the end wall 119 such as to provide a measurement of volume 118 at the conduit 115, or combinations thereof.

The sensor 240 sends or otherwise provides the operational parameter to the controller 210. The controller 210 sends or otherwise provides a control signal to the effort supply system 227. The effort supply system 227 may selectively alter or modulate the pressure of the effort variable 127 such as to alter the stiffness of the support structure 100 via altering the volume 118 at the conduit 115, thereby altering the pressure at the fluid 117 (e.g., defining a pneumatic, hydraulic, or lubricant fluid). In another embodiment, the effort supply system 227 may selectively alter or modulate the current of the effort variable 227 such as to alter the stiffness of the support structure 100 via altering the magnetic flux at the fluid 117 (e.g., defining a magneto-rheological fluid). For example, the effort supply system 227 may direct the effort variable 127 from the compressor section 21, or from a fluid system generally, such as, but not limited to, a fuel system, a lubricant system, a hydraulic system, or another pneumatic system (e.g., an air cycle machine).

The controller 210 may further execute instructions to determine a difference between an actual measurement of the operational parameter from the sensor 240 versus a desired parameter value. The controller 210 further sends or otherwise provides a commanded or desired magnitude of the effort variable 127 to the effort supply system 227. The effort supply system 227 provides the commanded or desired magnitude of the effort variable 127 such as to alter or modulate a pressure or magnetic flux at the fluid 117 within the conduit 115. In various embodiments, the commanded or desired magnitude of the effort variable 127 includes a desired pressure of the effort variable 127 such as to displace the end wall 119 to produce a desired pressure of the fluid 117 within the conduit 115.

In still various embodiments, the controller 210 may provide the commanded or desired magnitude of the effort variable 127 to adjust or modulate the stiffness at the support structure 100 based on a stored transfer function, graph, chart, table, or other predetermined value (e.g., stored at the memory 216). In one embodiment, the controller 210 may interpolate or extrapolate a desired magnitude of the effort variable 127 based at least in part on the stored transfer function, graph, chart, table, or other predetermined value.

Additionally, or alternatively, the commanded or desired magnitude of the effort variable 127 is based at least in part on a combination of operational parameters, such as, but not limited to, a vibration measurement at the static support 110 and/or gear assembly 40, a rotational speed at the rotor assembly 90, a pressure, flow, or current at the fluid 117 and/or effort variable 127, or a displacement at the end wall 119 such as to provide a measurement of volume 118 at the conduit 115, or combinations thereof.

The controller 210 may further adjust or modulate the end wall 119 of the support structure 100 such as to alter or modulate the stiffness of the support structure 100 based on the commanded or desired magnitude of the effort variable 127. In one embodiment, modulating the end wall 119 includes adjusting or modulating the pressure of the fluid 117 defining a hydraulic fluid, a pneumatic fluid, a lubricant, or a liquid or gaseous fuel via altering the volume 118 of the conduit 115. For example, altering the volume 118 of the conduit 115 includes changing a displacement of the end wall 119 such as to increase or decrease the volume 118 of the conduit 115. In another embodiment, modulating the end wall 119 includes adjusting or modulating the effort variable 127 defining an electrical current.

Embodiments of the engine 10 including embodiments of the variable stiffness support structure 100 generally shown and described herein provide passive or active variability of stiffness at one or more of the gear assembly 40, the bearing 160, or the static structure 110 generally, based on one or more engine conditions, or changes in engine condition. The engine 10 and support structure 100 shown and described herein enables variation of stiffnesses such as to provide a desired magnitude of stiffness such as to mitigate load transfer to the static structure 110 (e.g., the at the gear assembly 40, the bearing 160, etc.), to mitigate undesired vibratory modes, and/or to isolate or dampen undesired vibrations based on changes in engine condition.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, the engine comprising:
   a support structure comprising a gear assembly, the gear assembly comprising a ring gear, a carrier element, and a torque transfer component, the support structure further comprising a conduit coupled to a static support defining the ring gear or the carrier element, wherein the static support is coupled to the torque transfer component, and wherein the conduit defines an end wall between which a fluid is contained within a volume defined by the conduit;
   an effort variable provided to the support structure, wherein the effort variable modulates a stiffness of the support structure; and
   a fan assembly operably coupled to the gear assembly.

2. The engine of claim 1, further comprising:
   an effort supply system providing the effort variable to the support structure, wherein the effort variable defines a pressure of fluid or an electrical current.

3. The engine of claim 2, wherein the effort variable defines a pressure of pneumatic fluid from a compressor section of the engine.

4. The engine of claim 2, wherein the effort supply system defines an electric machine, and wherein the effort variable defines an electric current.

5. The engine of claim 1, wherein the fluid within the conduit defines a hydraulic fluid, a pneumatic fluid, a lubricant, or a magneto-rheological fluid.

6. The engine of claim 1, wherein the end wall defines a bladder, a diaphragm, or a piston cylinder.

7. The engine of claim 1, wherein the static support is coupled to a rotor assembly.

8. The engine of claim 1, further comprising:
   a sensor configured to acquire or calculate a signal defining an operational parameter of the engine; and
   one or more controllers comprising one or more processors and one or more memory devices, the one or more memory devices storing instructions that when executed by the one or more processors cause the one or more processors to perform operations, the operations comprising:
   acquiring, via the sensor, a signal defining an operational parameter of the engine;
   sending, via the sensor, the operational parameter to the controller; and
   sending, via the controller, a control signal to modulate the effort variable to alter the stiffness of the support structure.

9. The engine of claim 8, the operations further comprising:
   determining, via the controller, a difference between an actual measurement of the operational parameter versus a desired parameter value.

10. The engine of claim 8, the operations further comprising:
    sending, via the controller, a commanded magnitude of the effort variable to an effort supply system.

11. The engine of claim 10, wherein the commanded magnitude of the effort variable is a desired magnitude of pressure at the fluid within the conduit.

12. The engine of claim 10, wherein the commanded magnitude of the effort variable is a desired magnitude of magnetic flux at the fluid within the conduit.

13. The engine of claim 10, wherein the commanded magnitude of the effort variable is based at least in part on a vibration measurement at the static support, the gear assembly, or both, a rotational speed at the rotor assembly, a pressure, flow, or current at the fluid, the effort variable, or both, or a displacement at the end wall of the conduit, or combinations thereof.

14. The engine of claim 8, the operations further comprising:
    altering the stiffness of the support structure via modulating the end wall of the support structure.

15. The engine of claim 14, wherein modulating the end wall includes altering the volume of the conduit of the support structure.

16. The engine of claim 14, wherein modulating the end wall includes altering a magnetic flux at the fluid within the conduit.

17. The engine of claim 16, wherein altering the magnetic flux includes altering the effort variable defining an electrical current.

18. The engine of claim 1, wherein the effort variable defines a pressure of hydraulic fluid, pneumatic fluid, lubricant, liquid or gaseous fuel, or combinations thereof.

* * * * *